UNITED STATES PATENT OFFICE.

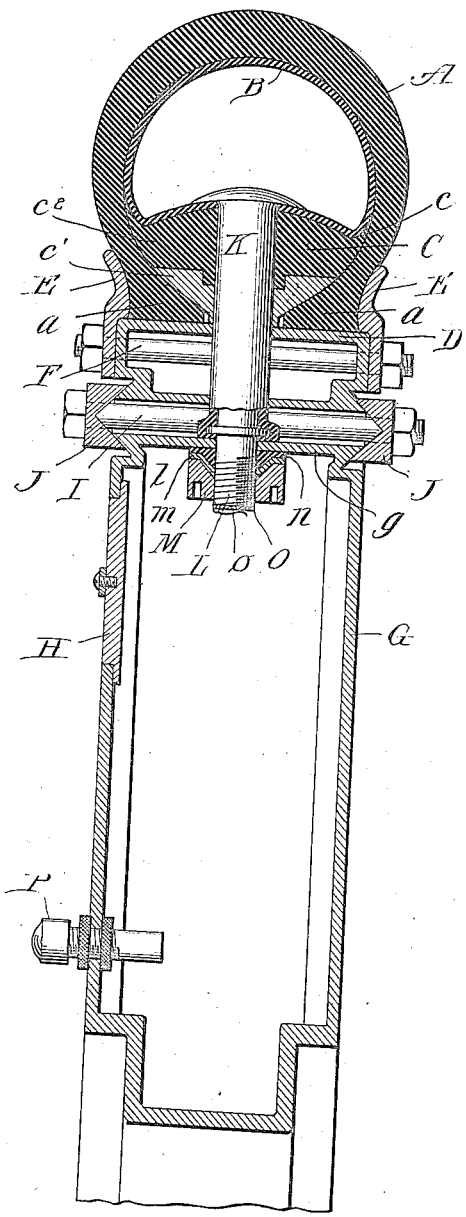
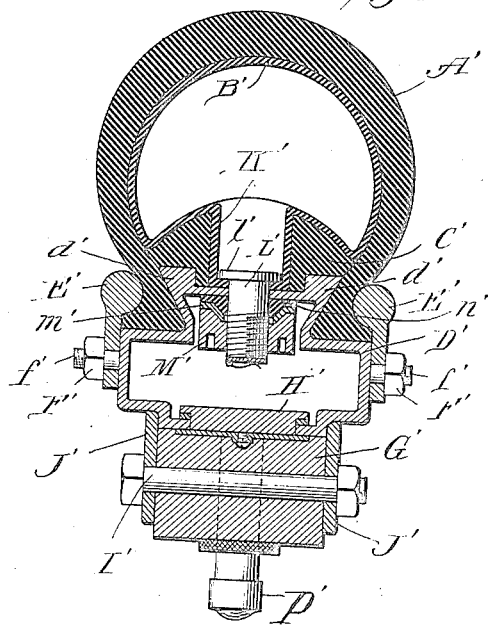
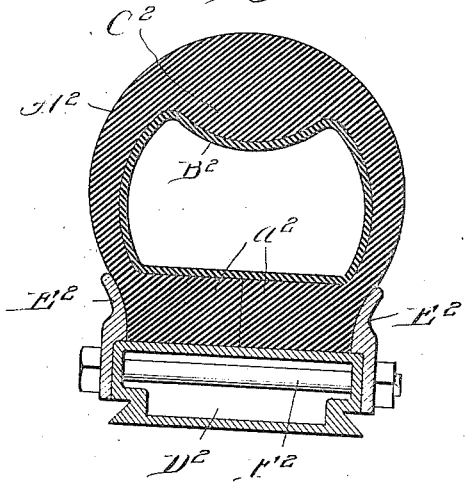

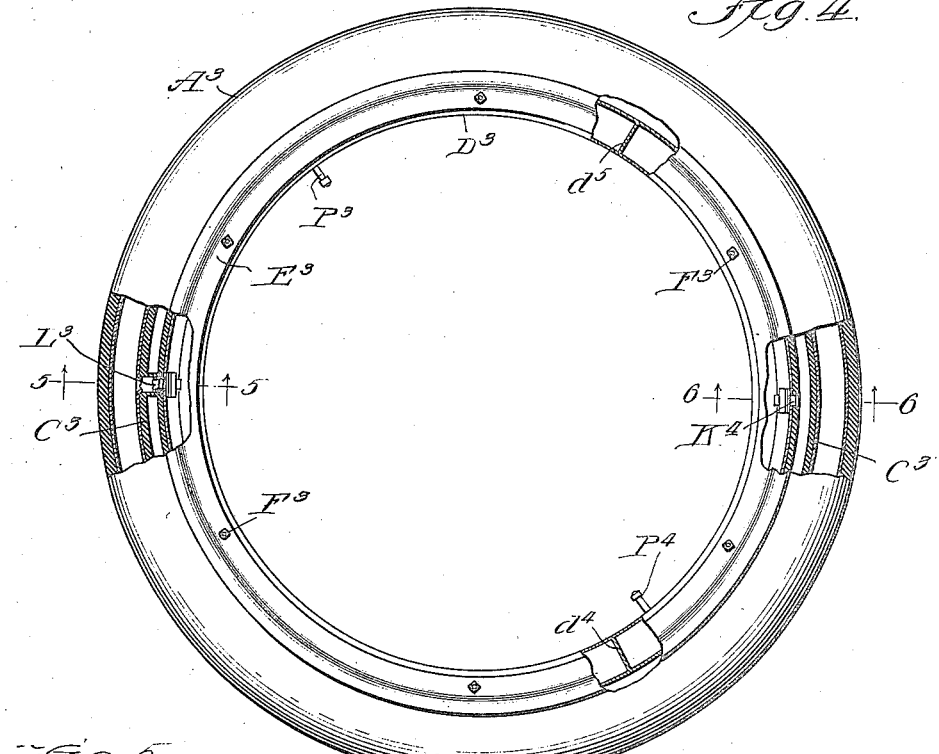
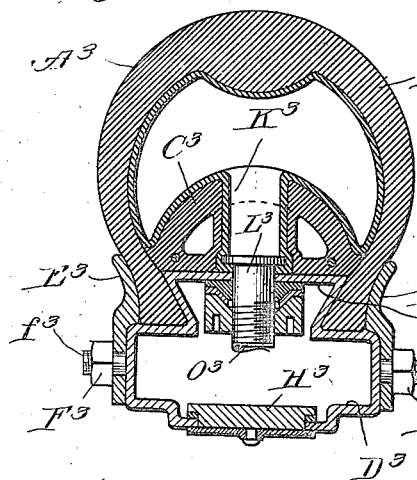
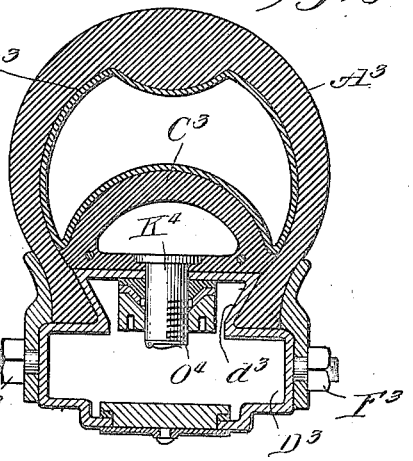

BENJAMIN W. DAVIS, OF CHICAGO, ILLINOIS.

PNEUMATIC TIRE.

1,183,440. Specification of Letters Patent. Patented May 16, 1916.

Application filed April 20, 1911. Serial No. 622,268.

*To all whom it may concern:*

Be it known that I, BENJAMIN W. DAVIS, a citizen of the United States, residing at Chicago, in the county of Cook and State of Illinois, have invented certain new and useful Improvements in Pneumatic Tires, of which the following is a specification.

My invention relates in general to vehicle tires, and more particularly to pneumatic tires for automobiles.

Pneumatic tires are recognized as affording the most perfect means for preventing the communication to the occupants of a vehicle of the jolts and jars to which wheels are subjected. Even in the use of pneumatic tires, however, severe shocks are often received when stones or other irregularities of the road are encountered, which are not only disagreeable to the occupants of the automobiles but also seriously injure the tires as well as the automobiles themselves. One of the most serious injuries which pneumatic tires encounter is that of "rim cutting," due to the engagement of the side flanges of the retaining rim with the sides of the tire casing when the tire is wholly or partially deflated, and even when the tire is suddenly compressed by encountering an obstacle.

One of the objects of my invention is to provide a pneumatic tire in which a sudden excessive pressure will be relieved by the discharge from the tire of a portion of the compressed air, and in which the discharged compressed air gradually returns into the tire, thereby preventing the sudden recoil incident to the use of ordinary pneumatic tires, and also avoiding the injury to the tire due to the sudden excessive compression of the air therein.

Another object of my invention is to provide a pneumatic tire having a longitudinal cushion located in the vertical plane of the tread which will engage the opposite interior surface of the tire when the tire is wholly or partially deflated, and also in case of the sudden compression of the portion of the tire in contact with the ground, thereby preventing injury to the tire, such, for instance, as cutting of the sides of the tire casing by the side flanges of the rim.

A further object of my invention is to provide a pneumatic tire having therein an annular pneumatic cushion separate from the usual inner tube of the tire, which will prevent rim cutting of the tire when compressed by sudden blows or when wholly or partially deflated.

A still further object of my invention is to provide a pneumatic tire comprising an annular pneumatic cushion therein disconnected from the inner tube of the tire, the inner tube of the tire and the pneumatic cushion being separately connected with expansion chambers for dissipating sudden excessive compression both in the inner tube and in the pneumatic cushion.

My invention will be more fully disclosed hereinafter with reference to the accompanying drawings, in which the same is illustrated as embodied in several convenient and practical forms, and in which—

Figure 1 is a cross sectional view through one-half of a wheel having thereon one form of my invention; Fig. 2, a view similar to Fig. 1, showing a modified embodiment of my invention; Fig. 3, a view similar to Figs. 2 and 3 illustrating a still further form of my invention; Fig. 4, a side elevational view of a pneumatic tire, parts being broken away, embodying a further form of my invention; Fig. 5, a cross sectional view on line 5 5, Fig. 4; and Fig. 6, a cross sectional view on line 6 6, Fig. 4.

Similar reference characters are used to designate similar parts in the several figures of the drawings.

Referring more particularly to Fig. 1, reference letter A indicates the casing of a pneumatic tire, which may be of any suitable cross section. Letter B indicates the usual inner tube provided in pneumatic tires. C indicates a cushion located within the inner part of the casing around which the inner tube B concentrically extends. The cushion C may be formed of any suitable material, preferably in part at least of rubber. In Fig. 1, the cushion is shown as comprising an inner portion $c'$ made of wood and an outer portion $c^2$ made of rubber.

The casing A, with the inner tube B and cushion C located therein, is mounted upon a demountable rim D, any suitable fastening means being provided for detachably securing the tire upon the rim, such, for instance, as rings E, E, which are secured on the opposite sides of the rim D by suitable fastening means, as, for instance, a bolt F extending through the rim. The outer portions of the rings E, E overlie the inner flanges on the tire casing A and retain the same in engagement with the cushion C.

In Fig. 1, I have shown my invention as applied to a hollow wheel G of a type frequently seen in use on heavy vehicles. The demountable rim D may be detachably secured around the wheel G by any suitable fastening means, such, for instance, as rings J, J having V-shaped grooves therein, the diverging surfaces of which engage correspondingly inclined surfaces on the adjacent edges of the wheel G and rim D. Bolts, such as indicated at I, connect the rings J, J and retain them in interlocked engagement with the wheel and rim.

K designates the tube through which the tire inner tube B is inflated. The lower end of the tube K is hermetically secured to the circumferential plate $g$ of the wheel G, it being understood that the interior of the wheel G is air-tight. The means which I have shown for securing the inner end of the tube K to the plate $g$ of the wheel comprises a short metallic coupling L having a bead around its upper end which overlies the inturned lower end of the tube K and clamps the same against the plate $g$. A nut M surrounds and is in screw threaded engagement with a coupling L and engages a conical metallic washer $m$ between which and the inner surface of the plate $g$ is a rubber washer $n$. The lower end of the coupling L is provided with a valve O which freely opens when there is an excessive pressure in the tire and closes when the pressure in the chamber within the wheel exceeds the pressure in the tire. A hole $o$ is provided through the valve O to permit a gradual equalization of the excessive pressure in the wheel with the pressure in the tire. The restricted return of air to the tire from the pressure chamber prevents a sudden expansion of the tire after it has been abnormally compressed by encountering an obstruction or by dropping into a rut. The rebound after a sudden compression of the tire is therefore prevented and the danger of breaking the springs and jolting occupants of the automobile is thereby avoided. The valve O may be of any well known type in which the hinge limits the opening of the valve to a movement of approximately 90°.

P indicates a coupling for supplying compressed air within the tire. Such coupling may be of the usual form employed on pneumatic tires.

The operation of the embodiment of my invention shown in Fig. 1 is as follows: When a sudden excessive pressure is created in the tire by contact with an obstruction, the excessive pressure opens the valve L and permits a discharge from the tire to the chamber in the wheel, thereby dissipating the blow on the tire. Immediately upon the discontinuance of the excessive pressure in the tire the valve O closes, thereby preventing a recoil which would result from the rushing of the air back into the tire, a gradual equalization being effected through the hole $o$ through the valve. The cushion C projects outwardly to a plane beyond the outer edges of the retaining rings E, E; hence when the tire is either wholly or partially deflated, or when it is subjected to a sudden blow, the sides thereof will not be cut by the rim as the inner surface of the tire opposite the cushion will come in contact with the cushion and support the load so as to prevent any load being communicated through the sides of the tire casing to the rim. Access may be readily had to the interior of the wheel G through a hole closed by the plate H, in order that the nut M may be applied or removed.

In Fig. 2 I have illustrated a form of my invention in which the expansion chamber is formed in the demountable rim D', which surrounds the felly G' of the wheel and is removably retained thereon by annular rings J', J', secured to the felly by bolts I', or other suitable means. Mounted upon the rim D' is a tire casing A' having therein an inner tube B' and a resilient cushion C'. Side retaining rings E', E' are secured to the opposite sides of the rim D' in any suitable manner, as by means of studs $f'$ extending through holes in the retaining rings and engaged by nuts F'. The outer portions of the retaining rings E', E' overlie the inner flanged edges of the casing and retain the same in engagement with the outwardly flared portion $d'$ of the rim. The inflating tube K' is hermetically united with the hollow rim D' by means of a coupling L' having a flange $l'$ at its upper end overlying the inturned inner end of the tube and clamping the same against the outer surface of the portion $d'$ of the rim. The coupling L' extends into the expansion chamber formed in the rim D' and is provided with a nut M' engaging a metallic washer $m'$ and forcing the same against a rubber washer $n'$ so as to prevent leakage from the expansion chamber around the coupling L'. In order to permit access to the interior of the expansion chamber to manipulate the nut M' an opening is provided through the inner wall of the rim which is hermetically closed by a suitable cap H'. P' indicates a coupling for supplying compressed air to the interior of the expansion chamber formed in the hollow rim D'.

In the form of my invention shown in Fig. 3, the cushion $C^2$ is shown as located within the tread of the tire. In said figure $A^2$ indicates the tire casing and $B^2$ the inner tube. The tire is mounted upon a demountable rim $D^2$ and is detachably secured thereto by the side rings $E^2$, $E^2$ connected to the rim by bolts such as $F^2$. The casing $A^2$ is shown as provided with abutting inturned flanges $a^2$ against which the cushion $C^2$ engages when the tire is wholly or partially inflated or when it encounters an obstruction and is thereby suddenly compressed. The cushion serves to protect the sides of the casing from being rim cut, in a manner similar to that above explained in connection with Figs. 1 and 2.

In Figs 4, 5 and 6 I have shown my invention embodied in a tire having a pneumatic cushion $C^3$. In said figures the tire casing $A^3$ surrounds a demountable rim $D^3$ and is detachably retained thereon by side rings $E^3$, $E^3$ secured to the rim by studs $f^3$ engaged by nuts $F^3$. $B^3$ indicates the inner tube provided with a tube $K^3$ through which communication is had with an expansion chamber in the rim $D^3$. A suitable coupling $L^3$ unites the inner end of the tube $K^3$ with the adjacent wall of the rim $D^3$, leakage being prevented by suitable means, such for instance, as the nut and washers described in connection with Figs. 1 and 2. The pneumatic cushion $C^3$ surrounds the outer portion $d^3$ of the rim $D^3$, and is provided with a coupling $K^4$ through which it communicates with the interior of the expansion chamber in the hollow rim $D^3$. Leakage of air around the coupling $K^4$ is prevented by any suitable form of packing, such, for instance, as that employed for hermetically uniting the inner tube to the expansion chamber above described in connection with Figs. 1, 2 and 5. The hollow interior of the rim $D^3$ is provided with two radial partitions $d^4$, $d^5$, thereby forming separate expansion chambers, the larger of which communicates through the coupling $L^3$ with the inner tube of the tire, and the smaller of which communicates through the coupling $K^4$ with the interior of the pneumatic cushion $C^3$. The expansion chambers may be provided with couplings of the usual form $P^3$ and $P^4$ for supplying compressed air thereto. The couplings $L^3$ and $K^4$ are shown as provided at their inner ends with valves $O^3$ and $O^4$ constructed and operated the same as the valve O described in connection with Fig. 1.

In the operation of the form of my invention shown in Figs. 4, 5 and 6, it will be observed that rim cutting of the sides of the tire casing is prevented by a pneumatic cushion, which communicates with an expansion chamber to dissipate sudden shocks delivered thereto, and that the inner tube of the tire also communicates with a separate expansion chamber for relieving excessive pressure therein and preventing recoil.

It will be observed that in the form of my invention shown in Fig. 1, the inner flanges $a$, $a$ of the tire casing A are securely retained upon the rim by extending under the longitudinal cushion between which and the side rings E, E of the rim they are interposed. By this construction the necessity of providing circular wires in the inner flanges of the tire is avoided.

It will also be evident that in the form of my invention shown in Figs. 2, 4, 5 and 6 the tire casing is securely mounted upon the rim in a similar manner, inasmuch as the hollow rim is provided with an outwardly projecting portion having diverging side edges between which and the retaining rings of the rim the tire flanges are securely held.

In order that the danger of injuring the inner tube by being pinched between the cushion and the tire casing when deflated may be avoided, flaps $c$—shown in Fig. 1—may be secured to the side edges of the cushion and extend a short distance outwardly between the outer casing and the inner tube.

From the foregoing description, it will be evident that I have invented an improved pneumatic tire in which sudden shocks delivered to the tire are dissipated through communication of the tire with an expansion chamber, such communication being preferably controlled by a valve allowing the free discharge of the excessive pressure from the tire to the expansion chamber and restricting the equalization of pressure between the expansion chamber and tire, although a restricted communication between the tire and expansion chamber uncontrolled by a valve may to a less efficient degree perform the same function.

It will be further evident that by my invention rim cutting of the tire casing is prevented through the employment of a cushion within the tire which supports the weight of the vehicle and prevents the pinching of the tire casing between the road and the edges of the rim flanges, such cushion, if desired, itself consisting of a pneumatic chamber communicating with an expansion chamber.

It will be further observed that the provision of an expansion chamber in communication with a pneumatic tire renders it possible to use tires having thinner walls than ordinarily employed, inasmuch as the expansion chamber dissipates the shock received by the tire when encountering obstacles, thereby relieving the strain on the tire. The provision of a cushion, either solid or pneumatic, within a tire also permits tires having thinner walls than tires ordinarily have, as the cushion prevents the flattening of the tire when wholly or partially deflated, or subjected to a sudden blow, thereby protecting the walls of a tire and rendering it unnecessary that they should be as thick in order to be durable as is necessary when no cushion is employed.

It is further evident that by providing an expansion chamber in communication with a pneumatic tire, a tire smaller in cross section may be used, as the expansion chamber attains its capacity to that of the tire, thereby increasing the resiliency of the tire.

I claim:

1. The combination with a vehicle wheel, of a pneumatic tire thereon, an expansion chamber communicating with the tire, and a valve controlling the communication between the expansion chamber and tire for restricting the flow of pressure from the expansion chamber to the tire.

2. The combination with a vehicle wheel, of a pneumatic tire thereon, an expansion chamber communicating with the tire, and a valve controlling the communication between the expansion chamber and the tire and unseating toward the expansion chamber for permitting a free discharge of pressure from the tire to the expansion chamber, said valve when seated affording a small passage for restricting the flow of pressure from the expansion chamber to the tire.

3. The combination with a vehicle wheel, of a pneumatic tire thereon, a longitudinal pneumatic chamber within but not communicating with the tire, an expansion chamber, and separate means for permitting the free discharge of pressure from the tire and from the pneumatic chamber to the expansion chamber and for restricting the flow of pressure from the expansion chamber to the tire and to said pneumatic chamber.

4. The combination with a vehicle wheel, of a pneumatic tire thereon, a hollow rim surrounding the wheel and having side flanges between which the tire is supported, a longitudinal pneumatic cushion within the tire of greater thickness than the radial height of the side flanges of the rim, and means connecting said cushion with the interior of the hollow rim.

5. The combination with a vehicle wheel, of a pneumatic tire thereon, a hollow rim surrounding the wheel and having side flanges between which the tire is supported, a longitudinal pneumatic cushion within the tire of greater thickness than the radial height of the side flanges of the rim, and means separately connecting the interior of the hollow rim with the tire and with said cushion.

6. The combination with a vehicle wheel, of a pneumatic tire thereon, a longitudinal pneumatic cushion within the tire, and disconnected expansion chambers separately communicating with the tire and cushion.

7. The combination with a vehicle wheel, of a pneumatic tire thereon, a rim surrounding the wheel and having side flanges between which the tire is supported, a longitudinal pneumatic cushion within the tire of greater thickness when inflated than the radial height of the side flanges of the rim, and disconnected expansion chambers separately communicating with the tire and cushion.

8. The combination with a vehicle wheel, of a pneumatic tire, a hollow rim surrounding the wheel, side tire retaining rings on said rim, a central longitudinal projection surrounding the rim between which and the side rings the side flanges on the tire are secured, a pneumatic cushion supported upon said central projection of the rim, and means connecting said cushion with the interior of the rim.

In testimony whereof, I have subscribed my name.

BENJAMIN W. DAVIS.

Witnesses:
   HENRY A. PARKS,
   EDYTHE M. ANDERSON.